United States Patent
Piccionelli et al.

(10) Patent No.: US 11,179,627 B2
(45) Date of Patent: Nov. 23, 2021

(54) GAMING METHOD WITH AWARD PROVIDED BASED ON DETERMINATION OF PLAYER PRESENCE AT DEFINED LOCATION

(71) Applicants: Gregory A. Piccionelli, Westlake Village, CA (US); Michael M. Gerardi, Menifee, CA (US)

(72) Inventors: Gregory A. Piccionelli, Westlake Village, CA (US); Michael M. Gerardi, Menifee, CA (US)

(*) Notice: Subject to any disclaimer, the term of this patent is extended or adjusted under 35 U.S.C. 154(b) by 0 days.

(21) Appl. No.: 13/815,837

(22) Filed: Mar. 15, 2013

(65) Prior Publication Data

US 2014/0031128 A1  Jan. 30, 2014

Related U.S. Application Data

(63) Continuation-in-part of application No. 12/148,125, filed on Apr. 16, 2008, now abandoned, and a continuation-in-part of application No. 09/812,296, filed on Mar. 20, 2001, now Pat. No. 9,924,216.

(60) Provisional application No. 60/926,366, filed on Apr. 26, 2007, provisional application No. 60/191,003, filed on Mar. 21, 2000.

(51) Int. Cl.
*A63F 9/24* (2006.01)
*A63F 13/00* (2014.01)
*G06F 17/00* (2019.01)
*G07F 17/32* (2006.01)

(52) U.S. Cl.
CPC .......... *A63F 13/00* (2013.01); *G07F 17/3211* (2013.01); *G07F 17/3223* (2013.01); *G07F 17/3227* (2013.01); *G07F 17/3237* (2013.01)

(58) Field of Classification Search
CPC ............. A63F 13/216; A63F 2300/205; A63F 2300/204; A63F 2300/306
USPC ........................................................... 463/4
See application file for complete search history.

(56) References Cited

U.S. PATENT DOCUMENTS

| | | | |
|---|---|---|---|
| 2003/0104824 A1* | 6/2003 | Hale et al. ................. | 455/456 |
| 2007/0021166 A1* | 1/2007 | Mattila ...................... | 463/1 |
| 2007/0167225 A1* | 7/2007 | Nguyen et al. ............. | 463/29 |
| 2008/0039204 A1* | 2/2008 | Ackley et al. ............. | 463/40 |
| 2008/0045284 A1* | 2/2008 | Assaad et al. ............. | 463/9 |

* cited by examiner

*Primary Examiner* — Kang Hu
*Assistant Examiner* — Jason Pinheiro
(74) *Attorney, Agent, or Firm* — Gregory B. Gulliver

(57) ABSTRACT

A gaming method includes the steps of: providing a gaming application to a player, the application enabling the player to engage in a game in which a winner is determined based on the winner's location; defining the physical coordinates of a game-winning space; determining the position of the player by determining the position of a telecommunication device in the physical possession of the player; and providing an award to the player when the position of the player is determined to be within the game-winning space.

7 Claims, 6 Drawing Sheets

US 11,179,627 B2

GAMING METHOD WITH AWARD PROVIDED BASED ON DETERMINATION OF PLAYER PRESENCE AT DEFINED LOCATION

This application is a continuation-in-part of U.S. patent application Ser. No. 12/148,125, filed Apr. 16, 2008, which in turn was based on U.S. Provisional Patent Application Ser. No. 60/926,366, filed Apr. 26, 2007, and is also a continuation-in-part of U.S. patent application Ser. No. 09/812,296, filed Mar. 20, 2001, which in turn was based on U.S. Provisional Patent Application Ser. No. 60/191,003, filed Mar. 21, 2000, the entire disclosures of each of which are incorporated herein by reference and from each of which priority is claimed.

FIELD OF THE INVENTION

The present invention relates, generally, to a system, process and article of manufacture for distribution of information on a communications network and, in preferred embodiments, to such a system, process and article for distribution of information on the Internet or World Wide Web, based on the geographic location of the internet or web user requesting the information and/or the geographic location of the information provider.

The present invention further relates to systems and methods employing and benefiting from control of such information distribution, and more particularly to systems and methods for conducting games of chance. More specifically, the present invention relates to systems and methods wherein a player participates in a game of chance in which the player's location with respect to a physical location, for example a randomly selected location in an interactive walkway, determines whether the player wins the game.

BACKGROUND OF THE INVENTION

The Internet and World Wide Web (WWW) have opened vast new global marketplaces and opportunities for companies, organizations, institutions and individuals to distribute and obtain information and to interact verbally and visually with others, virtually on a world-wide basis. By employing the Internet and WWW, companies and groups of all sizes and individuals may have, in effect, a world-wide market in which to distribute information, products and services using the Internet or WWW (including, but not limited to, programs, movies, photographs, and other information that can be transmitted over the Internet or WWW).

However, such a geographically expansive marketplace can be problematic for contexts in which the information, products or services are intended for a particular geographic area or location. Typical web site operators have no control over or knowledge of the geographic area or location of a user accessing the web site and, thus, no control over the area or location at which its web site content may be read, viewed or otherwise downloaded. Similarly, typical Internet or web users have no control over or knowledge of the geographic area or location of the web site's operator server from which the web site content is read, viewed or otherwise downloaded.

Consider, for example, a company or individual involved in the business of selling a product or service, but which is constrained under statute or contract to a limited geographic sales region. In one representative example, a software company contracts with various software distribution companies to sell its software in specified sales regions, wherein each distributor is provided a sales region and, under the terms of the contract, is not allowed to sell the software outside of the region. A distribution company may desire to employ the Internet or WWW as a distribution channel, but would need to limit sales (and access to the distributed software) to only those Internet users (customers) that are located within the region assigned to that company.

As another example, consider a company or individual in the business of providing a lottery or other game in which a fee is required to play and the player is provided with a chance to win money or prizes. Under many legal jurisdictions (which can also be defined in terms of geographic areas), such lotteries and games may be illegal or otherwise limited by gambling statutes, rules or regulations. Again, the company or individual may desire to offer the lottery or game service over the Internet or WWW, but also avoid potential legal liability for offering such services to Internet users that are located in a geographic region of an adverse legal jurisdiction.

As yet another example, consider a company, organization or individual involved in distributing information having a content that is politically or ethically sensitive in certain geographic regions, but not other geographic regions. Again, the company, organization or individual may desire to provide the information over the Internet but, for political, ethical or legal reasons, may also desire to limit the accessibility to the information to certain geographic regions.

Thus, in a number of contexts, there is a need in the industry for a system by which a provider of a service or product on the Internet may readily limit access to the product or service, based on the geographic region in which the user requesting the product or service is located.

Another context in which control of access to a service based on location is games of chance. Games of chance that involve the random selection of numbers and/or letters, such as roulette, bingo or keno, are well-known. In such games, a player wagers on one or more numbers and/or letters, and wins if the chosen numbers and/or letters are randomly selected by the game's controller.

New games of chance are constantly being developed in order to sustain player interest, attract new players, and generate additional revenue. As new technologies, such as improved computers and advanced telecommunications, become available, opportunities for incorporating the new technologies into gaming methods present themselves.

A need exists for systems and method for conducting games of chance that incorporate advanced technologies to afford different and exciting experiences for players.

A need also exists for systems and methods for conducting games of chance that can be implemented in a variety of environments, including areas outside of traditional gaming venues such as casinos.

SUMMARY OF THE PREFERRED EMBODIMENTS

In accordance with one aspect of the present invention, there is provided a gaming method that includes the steps of: providing a gaming application to a player, the application enabling the player to engage in a game in which a winner is determined based on the winner's location; defining the physical coordinates of a game-winning space; determining the position of the player by determining the position of a telecommunication device in the physical possession of the player; and providing an award to the player when the position of the player is determined to be within the game-winning space.

In more particular embodiments, the physical coordinates of the game-winning space are determined by selection from a listing of physical coordinates of pre-defined game-winning spaces. In such embodiments, a plurality of game-winning spaces are pre-defined by specifying their physical coordinates, and a listing of these game-winning spaces with their physical coordinates is prepared; a game-winning space for a particular instance of the gaming method is then selected from the listing. Selection of a game-winning space, in very particular embodiments, can be carried out randomly or non-randomly.

In accordance with one aspect of the present invention there is provided a gaming method comprising the steps of providing a gaming application to a player, the application enabling the player to engage in a game in which a winner is determined based on the winner's location, defining physical coordinates of a game-winning space, determining the position of the player by determining the position of a telecommunication device in the physical possession of the player, and providing an award to the player when the position of the player is determined to be within the game-winning space.

In some embodiments, the physical coordinates of the game-winning space are determined by selection from a listing of physical coordinates of pre-defined game-winning spaces.

In some embodiments, a plurality of game-winning spaces are pre-defined by specifying their physical coordinates and a listing of game-winning spaces with their physical coordinates is prepared.

In some particular embodiments, a game-winning space is selected from the listing of game-winning spaces.

In some particular embodiments, the game-winning space is selected randomly.

In some embodiments the game-winning space can, in more specific aspects of the present invention, be embodied or embedded in physical structures, such as walkways (sidewalks, boardwalks, etc.), which can extend in two or three dimensions. Winning can also, in more specific aspects of the present invention, be determined by selecting a generalized identifying indicium, which can be, e.g., an alphanumeric code as well as a set of physical coordinates, and determining a player's position with respect to such an identifying indicium. Various specific aspects of the inventive gaming method thus can be implemented by means of an interactive walkway. Therefore, in accordance with a more specific aspect of the present invention, there is provided an interactive walkway that includes a plurality of walkway segments, each of the walkway segments being associated with a signal generator, a physical location, and an identifying indicium, and at least one receiver in communication with the signal generators, the at least one receiver being adapted to receive a transmission and activate at least one of the signal generators upon receipt of the transmission.

The walkway segments, in various particular embodiments, comprise boards forming a boardwalk; tiles forming at least a portion of a floor; concrete segments forming at least a portion of a sidewalk; or other discrete elements. According to alternative particular embodiments, the walkway segments are defined areas of an at least partially continuous surface, such as a floor or sidewalk The signal generators, in particular embodiments, are affixed to the walkway segments. In other particular embodiments, they are embedded within the walkway segment. In still other embodiments, they are placed at a location remote from the walkway segments, such as in a video display unit, a billboard, etc.

Signal generators useful according to embodiments of the invention comprise lights, more particularly incandescent lights, neon lights or other lights utilizing noble gases, fluorescent lights, and solid-state devices such as light-emitting diode. Other embodiments employ signal generators that produce an audible sound. Suitable sound generators include speakers, tone generators, and the like. Still other embodiments employ signal generators that comprise a video display device, such as a "Diamond Vision"-type video display screen. Yet other embodiments employ a cellular telephone or other telecommunication device as the signal generator. In general, any device capable of alerting a game participant that he or she has won a prize is useful according to the invention.

The location of the walkway segment is defined, in particular embodiments, by GPS coordinates identifying a point within the walkway segment, or alternatively, by a set of GPS coordinates delimiting at least a portion of an area of the walkway segment. The identifying indicium typically comprises an alpha-numeric designation.

Various configurations of receivers and signal generators are utilized according to various particular embodiments. In some particular embodiments, the interactive walkway includes one receiver that is in communication with each of the signal generators. Other particular embodiments make use of a plurality of receivers, each of the receivers being in communication with a portion of the signal generators such that each signal generator is in communication with at least one receiver. Still other embodiments include a plurality of receivers, each receiver being in communication with one of the signal generators, wherein the number of signal generators equals the number of receivers. In very particular embodiments, each walkway segment is associated with a separate signal generator and a separate receiver.

Signal generators and receivers can communicate by various means, including electrical connections, i.e., hardwired connections, or by wireless connections. The signal generators can also be powered by various means, such as connections to electrical grids, batteries, solar cells and the like.

Certain particular embodiments of the inventive walkway are substantially one-dimensional, i.e., the various walkway segments are arranged linearly. Other particular embodiments are two-dimensional and include at least three non-collinear walkway segments. Still other particular embodiments are three-dimensional, and thus include additional walkway segments that are non-coplanar with at least three non-collinear walkway segments. Such walkways can extend, for example, up and down stairways, via elevators or escalators, and can extend over or under themselves.

Interactive walkways according to the invention are useful in a variety of applications, such as advertising, provision of personalized audio or video displays, etc. Specific embodiments of the inventive walkways are particularly suitable for use in gaming methods. Thus, in accordance with another aspect of the present invention, there is provided a gaming method that includes the steps of: providing a gaming system including an interactive walkway as described herein, a transmitter adapted to communicate with the at least one receiver of the interactive walkway, and a controller adapted to communicate with the transmitter and with at least one player; randomly selecting an identifying indicium corresponding to a walkway segment; determining whether at least one player is within a preselected distance from the walkway segment to which the selected identifying indicium corresponds during at least one time within a preselected time interval; and alerting the at least one player when the player is determined to be within the preselected distance from the walkway segment by activating at least one signal generator of the interactive walkway.

The controller, in particular embodiments, includes a computer in communication with a network which is accessible to a player. Such networks generally include any networks accessible by a portable telecommunications device, such as a cellular telephone, Blackberry®, or the like, and thus include cellular telephone networks, wide-area networks such as the Internet, etc.

The location of the walkway segment is defined, in specific embodiments, by GPS coordinates identifying at least one point within the walkway segment, more specifically by a set of coordinates identifying an area within the walkway segment. In such embodiments, the GPS coordinates of at least one player are obtained and compared with the GPS coordinates identifying the at least one point within the walkway segment. The player's GPS coordinates are provided to the control site, in particular embodiments, by a telecommunication device carried by the player, more particularly by a cellular telephone comprising a GPS locator.

The walkway segments' identifying indicia comprise, in various embodiments, an alphanumeric designation, which can be, for example, a simple number, a combination of a letter and a number, two or more letters or numbers, or any other desired combination thereof.

A winning player is alerted by activating at least one signal generator, and if desired by two or more signal generators. This activation can be accomplished by various means. For example, in particular embodiments, the control site communicates an activation instruction to a transmitter, which communicates the activation instruction to a receiver in communication with at least one signal generator. One or more of the signal generator can be associated with the walkway segment the identifying indicium of which was randomly selected. In more particular embodiments, at least one of the activated signal generators is affixed to the walkway segment, or more particularly, embedded within the walkway segment. Alternatively, one or more activated signal generators can be remote from the walkway segment.

Signal generators of various types are employed according to particular embodiments, for example, lights, such as incandescent, neon (or other noble gas) or fluorescent lights, or light-emitting diode. Other signal generators useful according to embodiments of the invention include sound generators, such as speakers, sirens and the like, and video display devices.

Players participate in gaming methods according to the invention by directly contacting the controller, for example via telephone or by accessing a site on a network in communication with the controller, or alternatively, after being contacted by the controller and invited to participate. Such invitations can be issued as a benefit of enrollment in an organization, for example, or by previous submission of an application to participate. Whether the player contacts or is contacted by the controller, it is desirable to verify that the player is eligible to participate in the game (e.g., is of legal age). Thus, in particular embodiments, the controller verifies the player's eligibility to participate in the gaming method, for example, when the player accepts the controller's invitation to participate in the gaming method.

Once an identifying indicium has been randomly selected, particular embodiments of the inventive method specify a time interval during which it is determined whether a player is sufficiently near the corresponding walkway segment to win. In certain particular embodiments, the preselected time interval is calculated to commence at the time the identifying indicium is selected. In other particular embodiments, the preselected time interval is calculated to commence at a time prior to the time the identifying indicium is selected. According to these embodiments, the time interval surrounds the time the indicium is selected, allowing a player to be considered a winner if he or she is, or was, sufficiently close to the identified walkway segment when its identifying indicium is selected.

Gaming methods according to the present invention can be implemented to generate revenue from game sponsors, advertisers, and the like, and also from game players. Thus, according to particular embodiments, a player pays a premium in order to participate in the gaming method. In addition, multiple gaming rounds can be played, with the various selection, determination and notification steps being repeated sequentially, and a player can pay a premium for any desired number of rounds.

Gaming methods according to embodiments of the invention can be implemented using a single interactive walkway, or by using two or more interactive walkways, which can be connected or separated from one another.

Players can begin participating in gaming methods according to the invention at any desired time or location. In particular embodiments, the gaming method commences, and the player thus begins participation, when a player first approaches a walkway segment such that the distance between the player and the walkway segment is less than or equal to a preselected activation distance.

Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

In the figures, like numbers are used to denote like elements throughout.

DETAILED DESCRIPTION OF THE PREFERRED EMBODIMENTS

Control of information flow, in particular prevention of the flow of information to areas outside defined areas, finds applications in methods, in particular in games of chance wherein a criterion for winning, and in more specific applications also for playing, is physical presence within a desired location in space. Exemplary methods of such location-based games of chance are described below.

As used herein, a "game-winning space" is a collection of points in two or three dimensions, that are identified by physical coordinates and that delimit an area (in two dimensions) or a volume (in three dimensions). The physical coordinates can be, in various embodiments, GPS coordinates, or other coordinates determined by a local positioning system. A set of physical coordinates that delimit a game-winning space constitute a non-limiting example of an "identifying indicium" of the game-winning space.

As used herein, a "telecommunication device" is any device capable of accessing a telecommunication network and transmitting and/or receiving data via a network so accessed, and includes, without limitation, cellular telephones, smart phones, portable computing devices, including without limitation devices adapted to be worn by a user and capable of accessing a telecommunication network, etc.

As used herein, an "application" is a program or group of programs designed for an end user. In particular, a "gaming application" useful in practicing embodiments of the inventive method is a program or group of programs designed for use by a person desiring to play a location-based game of chance as described herein.

Figure 1:
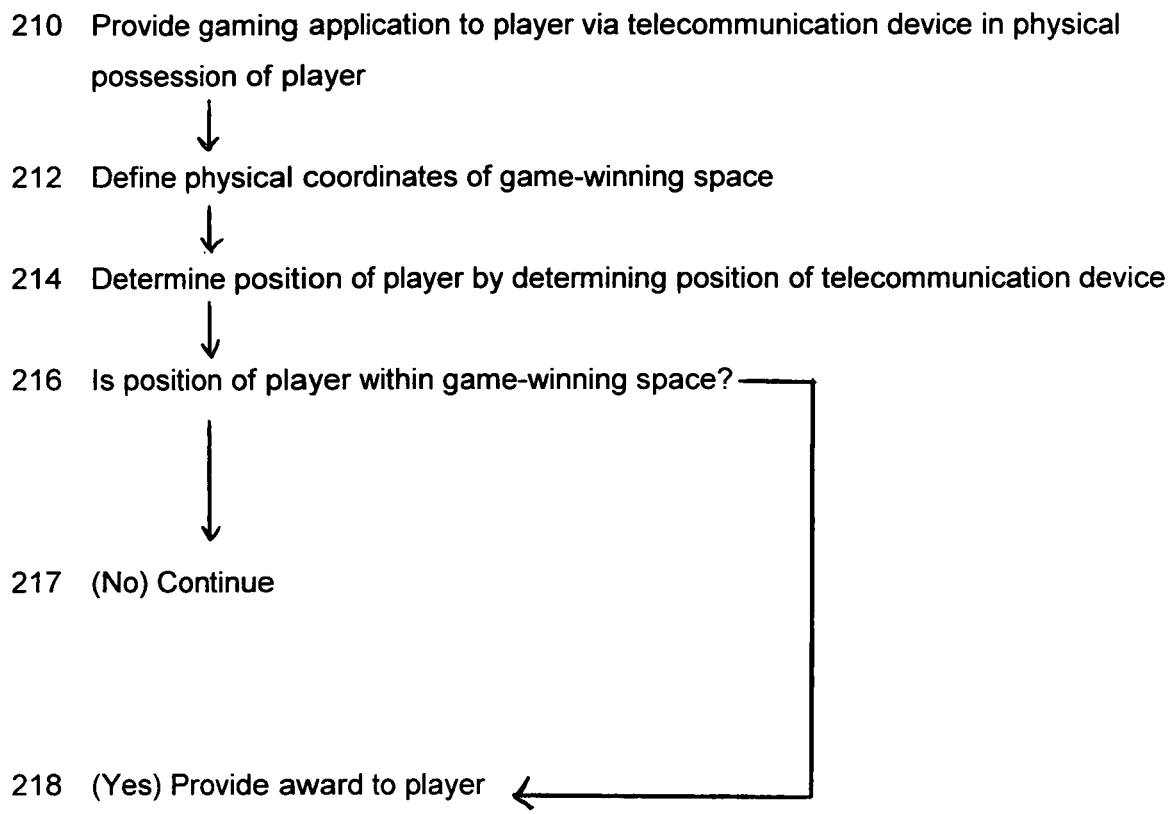
FIGS. 1-3 are flowcharts illustrating exemplary embodiments of gaming methods according to the invention.

With reference now to FIG. 1, a first exemplary embodiment of a gaming method of the invention commences with providing a gaming application to a player (210). The gaming application is provided to the player via a telecommunication device, such as a smart phone, a tablet or other computer device or which is in the player's physical possession. Physical coordinates of a game-winning space are defined (212). The physical coordinates can be, for example, selected from a listing of coordinates of a plurality of pre-existing or pre-specified game-winning spaces; alternatively, the physical coordinates can be randomly or non-randomly selected, or generated, for example, by selecting a single physical coordinate and then specifying a plurality of additional physical coordinates within a pre-specified, randomly selected or non-randomly selected distance from the selected single physical coordinate. As a non-limiting example, a physical coordinate of a position on a floor of an establishment, such as a department store, is selected, randomly or non-randomly, from a listing of eligible physical coordinates, e.g., positions within five feet of a plurality of displays of merchandise to which the establishment desires to draw attention. Once this initial physical coordinate is selected, a game-winning space is defined by selecting or generating (randomly or non-randomly, from a listing of physical coordinates, by use of a pre-selected formula, etc.) at least two additional physical coordinates within a distance "D" (e.g., 3 feet) of the initial physical coordinate, and, in very particular embodiments, further constrained with respect to the initial physical coordinate, e.g., lying in the same plane as the initial physical coordinate in order to define a game-winning space as an area lying on the floor in which the initial physical coordinate is located.

The position of the player is determined (214) by determining the position of the telecommunication device in the player's possession. If the player's position is determined (216) not to be within the game-winning space, play continues (217). If the player's position is determined to be within the game-winning space (218), then an award is provided to the player. The award can be any desired premium, including without limitation a monetary award, a gift certificate, a discounted or free membership in an organization, etc., and can be provided in any desired form, including without limitation direct deposit to an account belonging to the player, an e-mail message, a postal delivery, etc.

A winning player is alerted, in various embodiments of the inventive method, by transmission of information, such as an audiovisual message, directly to a telecommunication device in the player's physical possession. In further very particular embodiments, this direct transmission of information to the winning player is supplemented, or alternatively replaced, by transmission of the information to one or more other devices capable of displaying the transmission or generating another signal perceivable by the winning player. Such devices for supplemental or replacement signal generation include, without limitation, video display units disposed within or on various structures or at various physical locations, such as on internal or external building walls, merchandise display tables or racks, etc., as well as telecommunication devices in the physical possession of other winning and/or non-winning players, such as, for example in some embodiments, those within a pre-selected distance of the game-winning space.

As the foregoing description makes clear, control of information flow based on location data is carried out in the inventive gaming methods. In these methods, the transmission of information awarding a prize to a player is controlled on the basis of the player's presence in, or absence from, the game-winning space. Only when the player is physically present within the game-winning space is the information awarding the player a prize transmitted to the winning player (and optionally to other signal generation devices. Furthermore, in various additional embodiments, provision of the gaming application itself is controlled based on the location of the player(s). Transmission of the gaming application, in such embodiments, is restricted only to locations in which it is legal to engage in gaming methods according to the present invention, to locations in which it is desired that players move about in attempts to reach game-winning spaces (e.g., department stores, indoor or outdoor shopping centers, public streets, sporting venues, performance venues, etc.), and the like.

Further very specific embodiments of the inventive gaming method control the flow of gaming information based not only on location, but on additional criteria such as player age, membership in an organization that provides gaming applications, etc.

Figure 2:
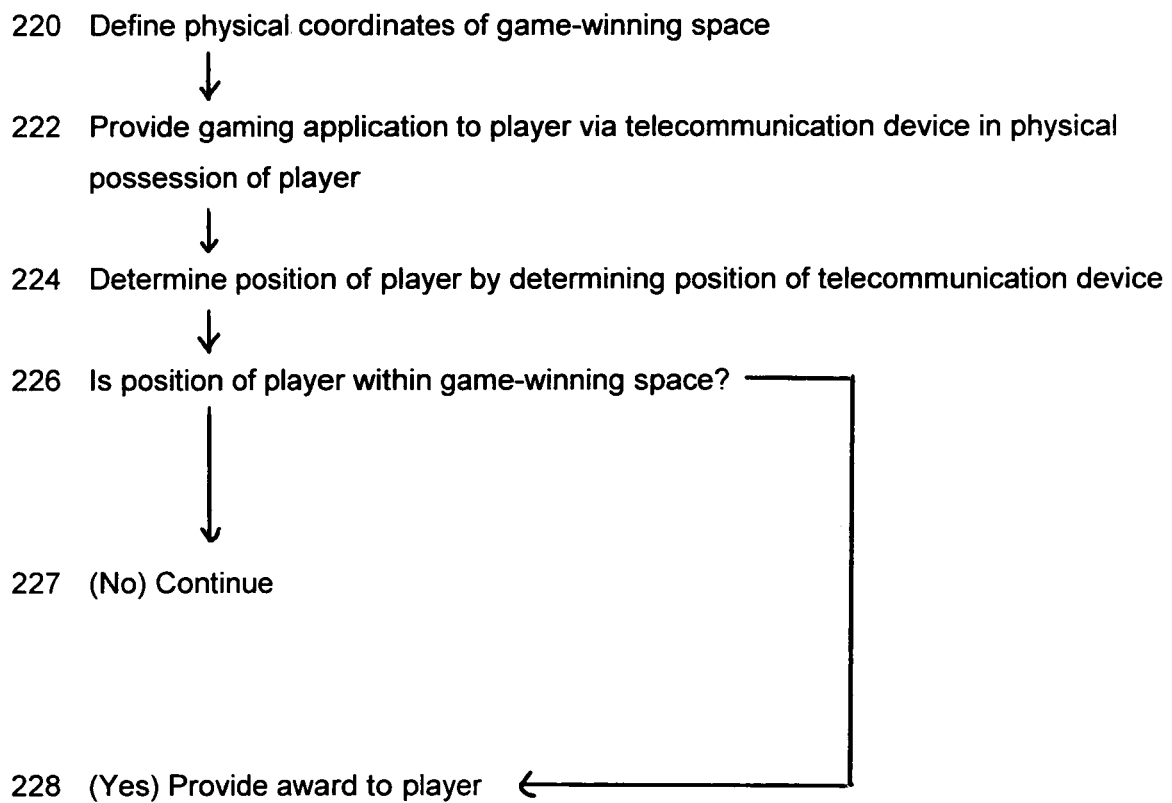

The physical coordinates of a game-winning space can be determined at any desired point during instances of the gaming method. Thus, in FIG. 2, a variation of the foregoing embodiment defines the physical coordinates of a game-winning space (220) prior to provision of the gaming application to the player (222). Play then proceeds similarly to the embodiment of FIG. 2 (224-228).

Figure 3:
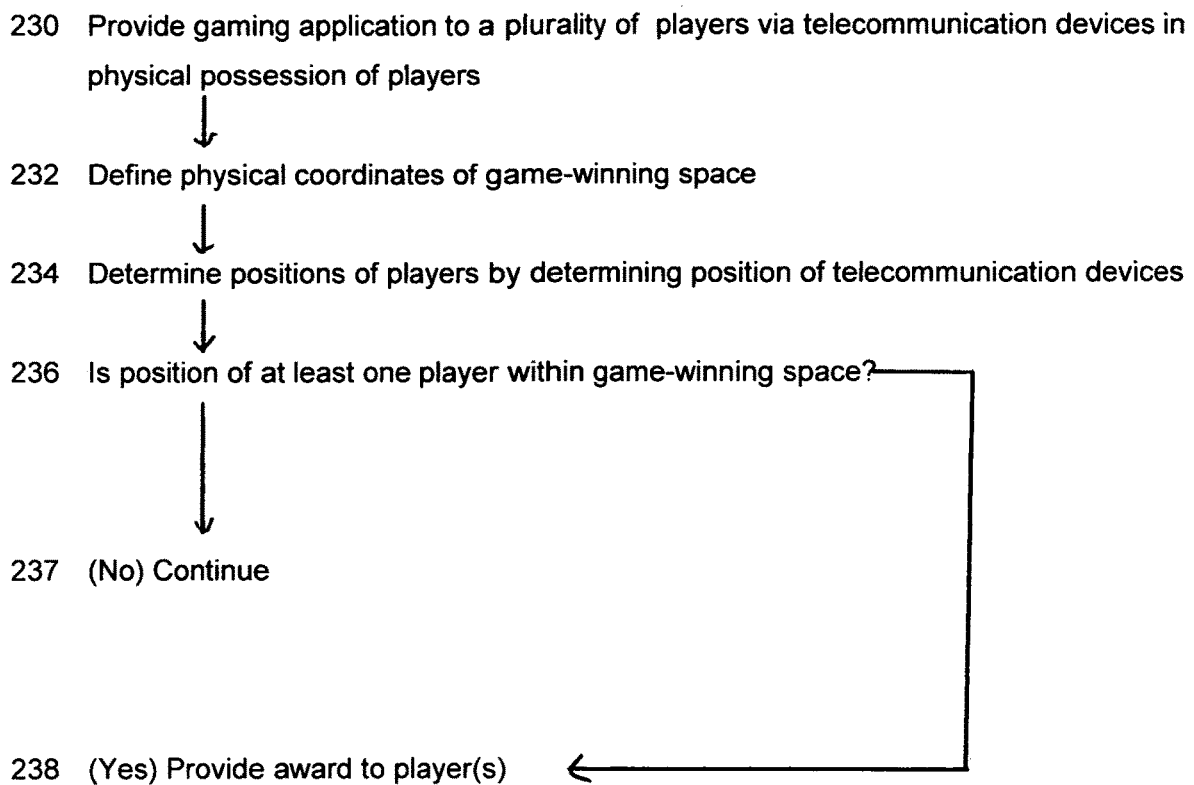

Multi-player games are practiced by providing the gaming application to a plurality of players, determining the positions of each of the players, and determining when the position of at least one player is within the game-winning space. Thus, in FIG. 3, the gaming application is provided to a plurality of players (230) via telecommunication devices in the players' physical possession. The game-winning space is defined (232), and the positions of the players are determined similarly to the preceding embodiments (234). When the position of at least one player is determined to be within the game-winning space, an award is provided to the winning player(s) (236-238).

Once a player has been provided with an award for being within a game-winning space, a new game-winning space can be defined, and the game can then be continued, with another award being provided to the next winning player(s). In this way, a game with multiple rounds can be provided. Rounds having any desired length of time are provided in various particular embodiments. In some specific embodiments, a round is defined by determining a time at which the physical coordinates of a game-winning space are defined and measuring the duration of the round from the time of selection. In other specific embodiments, a round is defined by determining a time at which the physical coordinates of a game-winning space are defined and measuring the duration of the round beginning with a time prior to the time of selection and extending forward from the prior time.

Various specific embodiments of gaming methods according to the invention are monetized by requiring a player to provide a premium, such as a monetary payment, purchase of a membership in an organization, or the like, prior to being provided with a gaming application and/or being permitted to play a game.

Additional embodiments of gaming methods of the invention are beneficial in encouraging players to establish a presence at specific physical locations for a desired length of time. In such embodiments, players are provided with some, all, or additional information based on the length of time spent at such locations. For example, in certain particular embodiments, a player is provided with the gaming application only after being present at an initial physical location for a pre-selected length of time. Thus, the player would be required to be present at an initial location, e.g., an area adjacent a display of certain clothing or other goods, for a time of 30 seconds. After that time, the player is provided with the gaming application and is enabled to participate in a game according to the invention. In other particular embodiments, a winning player's award is determined based on the length of time spent in the game-winning space. Points or other gaming credits, for example, are awarded per minute of presence in the game-winning space in various particular embodiments; similarly, different types of awards, such as upgraded gift certificates, are provided based on time spent in the game-winning space in further particular embodiments.

In certain more particular embodiments, once a player is determined to be within the game-winning space, a message is provided to the player advising the player to claim his or her reward by reaching another specified location, in very particular embodiment by doing so within a specified length of time. An example of such a "Simon Says!" embodiment provides a winning player with the message, "Proceed to the "Hot Jeans" display within one minute to claim your prize!" If the player's physical location is subsequently determined to be within the location specified in the message within the stated time, then the award is provided to the player.

Various embodiments of gaming methods according to the invention can be carried out remotely. In such embodiments, a person who cannot be physically present at a game-winning location (for example, a person whose physical location is remote from the building, shopping center, park or other area in which a game is being played) can still participate in the game by remotely directing a second person who is able physically to enter a game-winning location.

Figure 4:
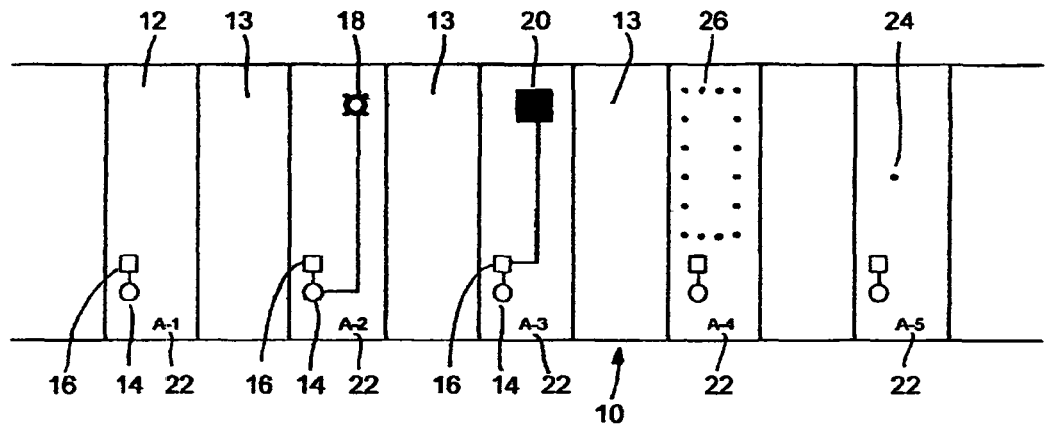
FIG. 4 is a top plan view of a portion of an embodiment of an interactive walkway of the invention that includes a plurality of walkway segments, each with an embedded signal generator and receiver, and including alternative power sources such as solar cells and batteries.
Figure 5:
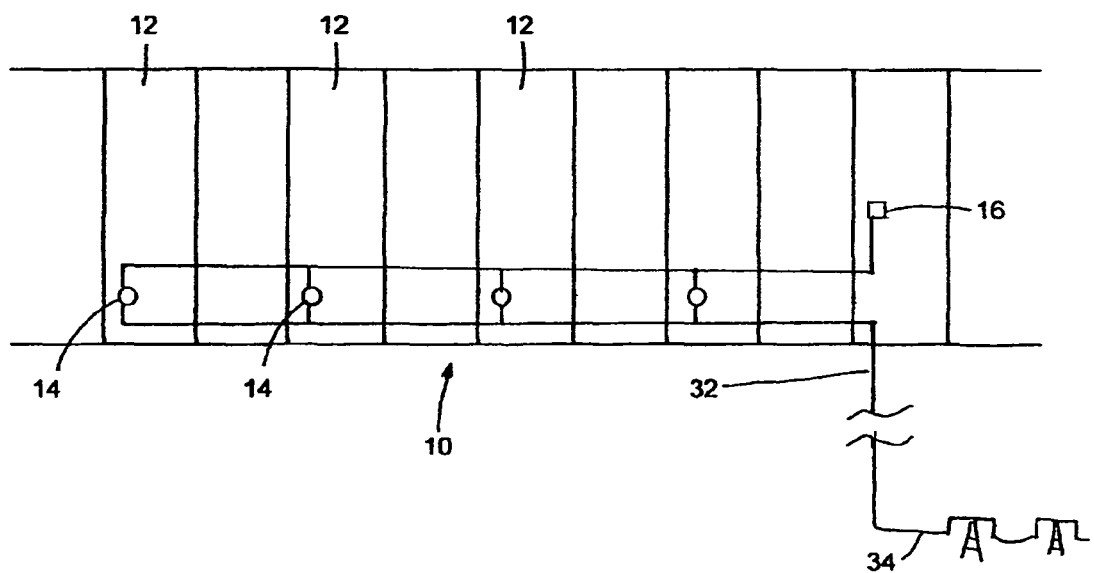
FIG. 5 is a top plan view of a portion of another embodiment of an interactive walkway in which a plurality of signal generators in separate walkway segments communicate with a single receiver, and are powered by a connection to an electrical grid.

Very specific embodiments of the inventive method make use of interactive walkways in gaming. Turning now to FIG. 4, interactive walkway 10 includes a plurality of interactive walkway segments 12 which are associated with signal generators 14 and receivers 16. Each interactive walkway segment 12 has a distinct physical location, which can be defined, for example, by a single set of GPS coordinates 24, or by a group of GPS coordinate sets 26 which define an area encompassing at least a portion of the interactive walkway segment. Each interactive walkway segment 12 is assigned an identifying indicium 22, which can be, for example, a number, a letter, a combination of a number and a letter, or any other desired combination. The identifying indicium 22 can be visibly displayed on interactive walkway segment 12 (as shown in FIG. 4), and in particular embodiments is stored in a storage medium accessible by a controller 600 (see FIGS. 7a-c) used to implement a gaming method employing the interactive walkway as described below.

Interactive walkway 10 can include both interactive walkway segments 12 and non-interactive walkway segments 13, or alternatively, interactive walkway 10 can be comprised solely of interactive walkway segments 12. Non-interactive walkway segments 13 are segments that are not associated with a signal generator 14 and are not assigned identifying indicia 22.

Interactive walkway segments 12 can comprise any desired material. Non-limiting examples include wooden boards or planks, concrete slabs, tiles, synthetic materials, etc. Segments can also be arranged in any desired configuration. For example, wooden boards or planks can be assembled into an interactive boardwalk; concrete slabs, into an interactive sidewalk; tiles or synthetic materials, into an interactive floor or stairway; etc. Furthermore, interactive walkway segments need not be discrete elements, but can also constitute defined areas of a continuous surface, such as a nightclub floor, a lawn, a playing field, or the like.

Signal generators 14 and receivers 16 can be associated with the interactive walkway segments 12 in a variety of ways. For example, a signal generator and a receiver can be affixed to a surface of the interactive walkway segment. Alternatively, the signal generator and/or the receiver can be embedded within the interactive walkway segment. In still other alternative embodiments, one or more signal generators can be disposed remotely from its associated interactive walkway element. For example, a video display unit associated with one or more interactive walkway elements can be mounted on a nearby building or other structure (see FIG. 6, video display units 50).

Signal generators and/or receivers can be powered in various ways. As shown in FIG. 4, individual signal generators and/or receivers can be powered by solar cells 18 or batteries 20. Alternatively, two or more signal generators and/or receivers can be connected to a common power source. As shown in FIG. 4, a plurality of signal generators 14, as well as common receiver 16, communicate with an electrical power grid 34 by means of an electrical connection 32, such as a dedicated cable.

Various types of signal generator are useful according to embodiments of the inventive walkway. Useful signal generators include, without limitation, lights, such as incandescent lights, neon lights or other lights utilizing noble gases (e.g., krypton, xenon), fluorescent lights, and light-emitting diodes or other solid-state devices; speakers, tone generators and other signal generators that produce an audible sound; and video display devices, such as a "Diamond Vision"-type video display screens, crawling displays and other animated display devices.

The signal generators need not all be fixed in one location. Thus, in particular embodiments, a cellular telephone or other telecommunication device in the possession of a player is useful as the signal generator.

Signal generators 14 and receivers 16 can be connected to each other by means of an electrical connection such as a cable or wire, or alternatively, can be in wireless communication with each other. Signal generators and receivers can, if desired, be combined into an integrated unit that performs the functions of each; for example, a solid-state device such as a light-emitting diode can be produced as part of a microchip that also includes a receiver.

Figure 6:
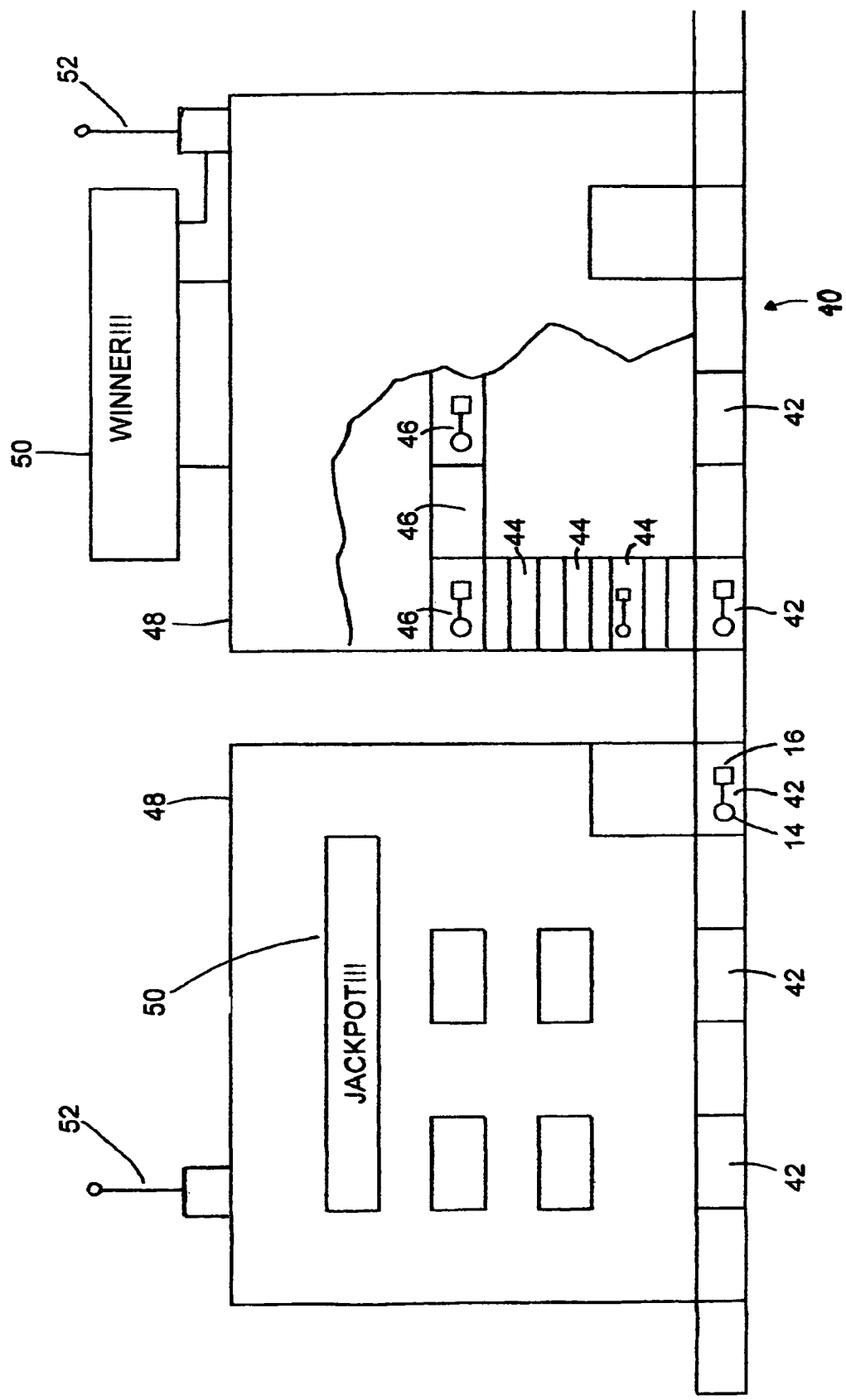
FIG. 6 is an illustration of another embodiment of an interactive walkway that includes sidewalk segments, together with stairway segments and floor segments that extend into a building, and also includes signal generators in the form of video displays mounted on several buildings as well as signal generators affixed to various of the segments.

Turning to FIG. 6, an interactive walkway 40 includes sidewalk interactive walkway segments 42, as well as floor segments 46 (second-floor segments are illustrated) and stairway segments 44, with associated receivers 16 and signal generators 14, including video display units 50 mounted on buildings 48 and in communication with building-mounted receivers 52. As shown, interactive walkways according to embodiments of the invention need not be confined to linear or planar configurations, but can extend throughout a three-dimensional space.

Interactive walkways according to the invention are useful in a variety of applications, including advertisement campaigns in which signal generators provide messages to individuals entering randomly selected interactive walkway segments, and in particular in implementing gaming methods that award premiums to players who are present at randomly selected segments. An exemplary gaming system, employing an interactive walkway according to the invention together with additional control elements, is illustrated in FIGS. 7a-c.

Figure 7A:
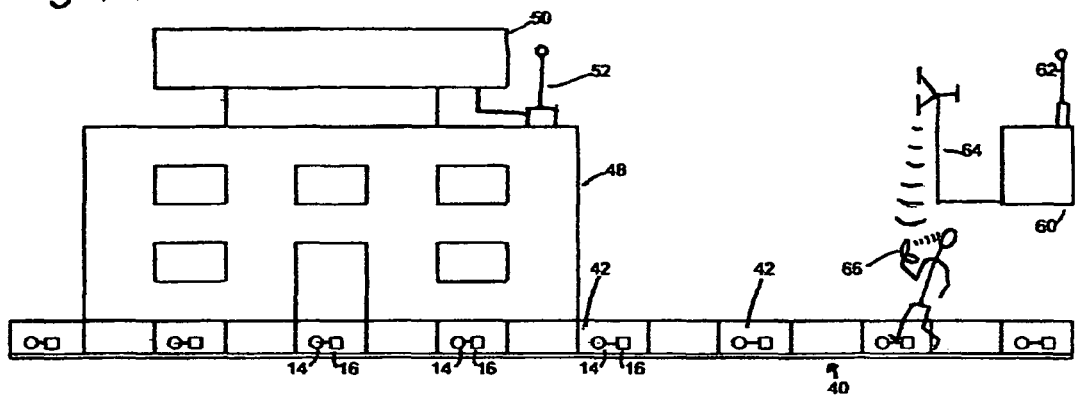
FIGS. 7a-7c illustrate an embodiment of a gaming method according to the invention that makes use of a user's cellular telephone as well as an interactive walkway including sidewalk segments and a signal generator mounted atop a building.
Figure 7B:
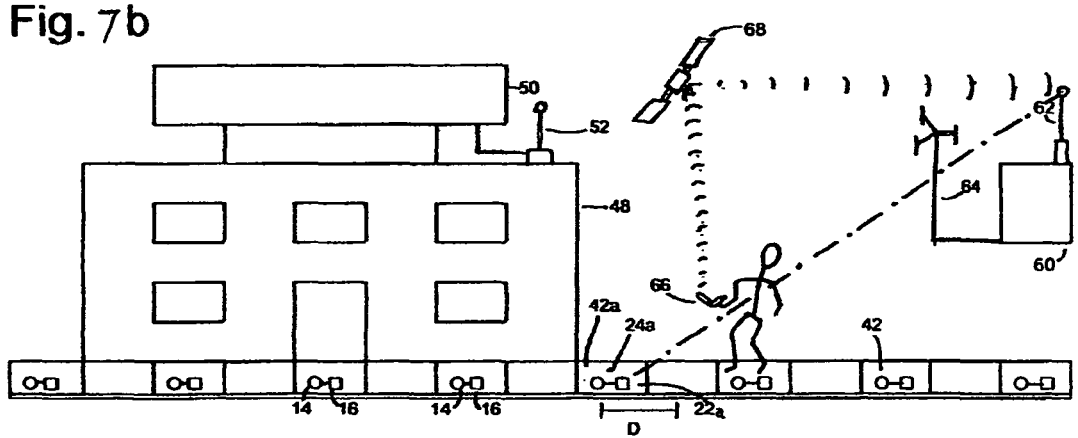
Figure 7C:
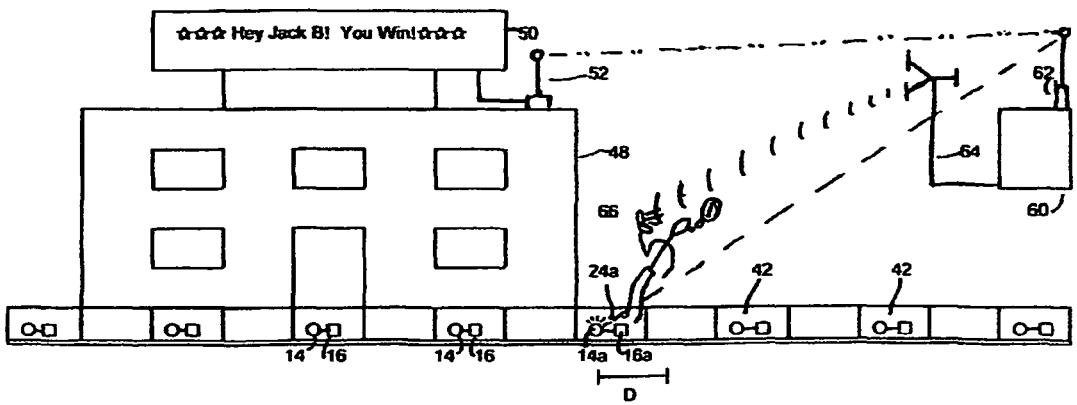

In FIG. 7a, a potential player carrying a telecommunication device (as illustrated, a cellular telephone) 66 receives a call via cellular network 64 from controller 60 inviting him to participate in a game. Potential players can be contacted in a variety of ways. For example, a potential player can join a players' club, with or without payment of a premium. On joining the players' club, the player provides the club with one or more contact numbers, such as cellular telephone numbers or pager numbers, at which the player can be contacted. In particular embodiments, the contact number corresponds to a cellular telephone having a GPS locator, which facilitates both contacting the potential player and ascertaining his location with respect to subsequently-selected interactive walkway segments. Alternatively, a potential player can contact the game's controller at a publicly-accessible telephone number, website, etc. and request to participate in a game.

The player can be contacted prior to entry onto a portion of interactive walkway 40, or alternatively, after entry onto a portion thereof. In particular, the player can be contacted when his GPS coordinates are determined to be within a specified distance, such as one hundred yards, from the nearest interactive walkway segment.

It is desirable that the eligibility of a player to participate in the gaming method (such as meeting a minimum age requirement) be confirmed prior to authorizing the player to participate. Thus, more specific gaming methods of the invention require the potential player to confirm that he is in fact eligible to participate. Confirmation can be effected by, for example, providing a credit card number, driver's license number or other evidence of age, residency, etc. as required by the appropriate regulatory authority. Alternatively, such information can be provided by a potential player prior to contact (for example, at the time the potential player joins the players' club mentioned above).

Controller 360 can be, in various embodiments, a site on a network, such as the Internet, that implements appropriate software controlling operation of the game; a physical location such as an office in which live operators communicate with potential players and personally operate the game; etc.

The player can, in particular embodiments, elect to participate in one or more rounds of a game. That is, the player can specify how many times an identifying indicium corresponding to a walkway segment will be selected before his participation in the game ends. Each round can include the selection of one or more identifying indicia. Rounds can be defined in a variety of ways in particular embodiments. In certain embodiments, rounds are defined by determining a time of selection of an identifying indicium associated with the round and measuring the duration of the round from the time of selection. In certain alternative embodiments, rounds are defined by determining a time of selection of an identifying indicium associated with the round and measuring the duration of the round beginning with a time prior to the time of selection and extending forward from the prior time.

In more particular embodiments, the player is assessed a premium for each round or each identifying indicium. This can be carried out, for example, by billing an account associated with the game that the player maintains, by making a credit- or debit-card purchase, or in any other desired manner.

In FIG. 7b, the player now proceeds along interactive walkway 40. The player's location is periodically or continually determined, for example, by determining the player's GPS coordinates via telecommunication device cellular telephone 66 and GPS satellite 68. Meanwhile, controller 60 randomly selects an identifying indicium 22a corresponding to an interactive walkway segment 42a having GPS coordinate set 24a, using any desired method for random selection of an item. The player's location is then compared with coordinate set 24a to determine whether the player is within a predetermined distance D (for example, five feet) from interactive walkway segment 42a. In particular embodiments, it is also determined whether the player's location is within distance D of interactive walkway segment 42 within a preselected interval of time T (the duration of the current game round). The interval of time T can be measured from the time identifying indicium 22 was selected, or alternatively, can be an interval of time beginning prior to the time of selection and measured backward from the time of selection, and extending forward to predetermined time after the time of selection. That is, the time interval during which the player must be within distance D of interactive walkway segment 42 (as measured from GPS coordinate set 24a) can have the time at which identifying indicium 22 was selected as a starting point or as a point within the time interval When it is determined that the player's location is within distance D of interactive walkway segment 42, and more particularly within the duration of the current game round, controller 60 alerts the player by activating at least one signal generator of the interactive walkway. Turning to FIG.

7c, controller 60 communicates with receiver 16a of interactive walkway segment 42a, which in turn activates signal generator 14a, for example a light embedded within interactive walkway segment 42a. The light then attracts the attention of the player, alerting him that he has won the current game round. Controller 60 also communicates with building-mounted receiver 52, which in turn activates video display unit 50 mounted on building 48. Video display unit 50 then displays a message to the player, notifying him that he has won the current game round.

Communication between controller 60 and receivers 16a and 50 can be by wireless means, or alternatively via a dedicated hard line connection Additionally, controller 60 contacts the player's telecommunication device 66 and provides an audio message advising him that he has won the current game round.

Although several different signal generators are activated in FIG. 7c, it should be recalled that activation of multiple signal generators is not essential to the inventive gaming methods. Activation of a single signal generator is sufficient, with multiple activations simply providing additional notification to the player and making it more certain that the player will become aware of winning the current game round.

Once the player has been notified of winning the current game round, he then contacts controller 60, or a designated alternative contact, to claim the prize for that round.

In the specific gaming embodiments described above that employ interactive walkways, distinct signal generators and receivers (i.e., separate devices) have been described. Alternative embodiments of such gaming methods combine signal generation and reception functions in a single device, in particular a telecommunication device in the physical possession of a player. In such embodiments, rather than relying on a plurality of individual signal generators physically embedded in or combined with distinct physical structures such as discrete walkway, floor and/or stairway segments, such signal generators being in communication with a distinct receiver that receives a transmission (e.g., from a server or other controller that operates a game according to embodiments of the invention), a player's own telecommunication device both receives a transmission from the controller and generates a signal to the player, such signal being in any desired form, such as an audio, video or audiovisual message, text message, etc. Such embodiments simplify the structure of the interactive walkway system by reducing the number of separate elements required in order to engage in the game.

What is claimed is:

1. A gaming method comprising the steps of:
 i) providing a gaming application to a telecommunication device having a position associated with a player, the application enabling the player to execute the game application in which a winner is determined based on position of the telecommunication device determined by a GPS receiver,
 ii) defining physical coordinates of a game space, prior to determining the position of the telecommunication device,
 iii) determining with a controller in the telecommunication device, the position of the telecommunication device in the from a signal received by the telecommunication device, and
 iv) providing an award when the position of the telecommunication device in response to the controller in telecommunication device identification of the position being associated with the game space where the telecommunication device must be in the game space for a predetermined amount of time.

2. The gaming method of claim 1 wherein the physical coordinates of the game space are determined by selecting from a list of physical coordinates of pre-defined game spaces.

3. The gaming method of claim 2 wherein a plurality of game-spaces are pre-defined by specifying list of game spaces with each game-space in the list of game spaces being associated with physical coordinates.

4. The gaming method of claim 3 wherein the game space is selected from the list of game spaces.

5. The gaming method of claim 4 wherein the game space is selected randomly from the list of game spaces.

6. A gaming system comprising:
 a) an interactive walkway comprising
  1) a plurality of walkway segments, each of the walkway segments of the plurality of walkway segments being a discrete element associated with
   A) a plurality of signal generators, with each signal generator associated with at least one of the plurality of walkway segments,
   B) a physical location, and
   C) an identifying indicium, and
  2) an at least one receiver in communication with at least one of the signal generators for a predetermined amount of time, the at least one receiver being adapted to receive a transmission and activate at least one of the signal generators upon receipt of the transmission,
 b) a transmitter adapted to communicate with the at least one receiver with the transmission, and
 c) a controller coupled to the transmitter in a telecommunication device that selects an identifying indicium from a set of identifying indicia associated with the plurality of walkway segments.

7. The gaming system of claim 5 wherein the physical location of the walkway segment is defined by a set of Global Positioning System (GPS) coordinates delimiting at least a portion of an area of the walkway segment.

* * * * *